United States Patent
de Almeida et al.

(10) Patent No.: US 7,702,955 B2
(45) Date of Patent: Apr. 20, 2010

(54) METHOD AND APPARATUS FOR DETECTING A FAULT CONDITION AND RESTORATION THEREAFTER USING USER CONTEXT INFORMATION

(76) Inventors: Adrian S. de Almeida, 94 Greensboro Drive, Markham Ontario (CA) L3R 0V8; Mohammad-Reza Ahmadi, 10330 Yonge Street, Apt. 811, Richmond Hill Ontario (CA) L4C 5N1; Ivan Wong Yin Yang, 179 Silver Rose Cres., Markham Ontario (CA) L6C 1W9; Hongtao YHT Yan, 819 Leith Hill Rd., Apt. 24, North York Ontario (CA) M2J 1Z3

(*) Notice: Subject to any disclaimer, the term of this patent is extended or adjusted under 35 U.S.C. 154(b) by 761 days.

(21) Appl. No.: 11/319,926

(22) Filed: Dec. 28, 2005

(65) Prior Publication Data

US 2007/0168722 A1 Jul. 19, 2007

(51) Int. Cl.
*G06F 11/00* (2006.01)
(52) U.S. Cl. ........................................... 714/10
(58) Field of Classification Search .............. 714/10–14
See application file for complete search history.

(56) References Cited

U.S. PATENT DOCUMENTS

| | | | |
|---|---|---|---|
| 4,598,356 | A | 7/1986 | Dean et al. |
| 4,851,991 | A | 7/1989 | Rubinfeld et al. |
| 5,504,859 | A | 4/1996 | Gustafson |
| 6,009,258 | A | 12/1999 | Elliott |
| 6,496,890 | B1 | 12/2002 | Azevedo et al. |
| 6,505,298 | B1 | 1/2003 | Cerbini et al. |

(Continued)

FOREIGN PATENT DOCUMENTS

GB 1 566 951 A 5/1980

(Continued)

OTHER PUBLICATIONS

Ahmed, R E et al.; Cache-aided rollback error recover (CARER) algorithm for shared-memory multiprocessor systems; Jun. 26, 1990; International Symposium on Fault Tolerant Computer; pp. 82-88.

(Continued)

*Primary Examiner*—Bryce P Bonzo
(74) *Attorney, Agent, or Firm*—Timothy F. Loomis; Michael DeHaemer

(57) ABSTRACT

A processing unit of a system detects a fault condition associated with the co-processing unit and, upon detection, restores the processing unit using stored user context information. During normal operation, user context information used to execute operation commands are stored by the co-processing unit in memory and maintained after fault detection. A fault condition is detected when at least a portion of the processing unit is rendered non-operational due to a discharging electrostatic event. Fault conditions may be detected by receiving information by the co-processing unit indicative of a fault condition, or by checking at least one memory location associated with processing unit to determine if information stored therein indicates a fault condition. The co-processing unit returns the processing unit to a known, workable state by using the stored user context information to restore the pre-fault detection state information to the memory locations associated with the processing unit.

33 Claims, 7 Drawing Sheets

U.S. PATENT DOCUMENTS

| | | |
|---|---|---|
| 6,532,497 B1 | 3/2003 | Cromer et al. |
| 6,543,002 B1 | 4/2003 | Kahle et al. |
| 6,560,726 B1 | 5/2003 | Vrhel, Jr. et al. |
| 6,591,379 B1 | 7/2003 | LeVine et al. |
| 6,742,139 B1 | 5/2004 | Forsman et al. |
| 2002/0093505 A1 | 7/2002 | Hill et al. |
| 2004/0003312 A1 | 1/2004 | Smith |
| 2005/0050386 A1* | 3/2005 | Reinhardt et al. ............. 714/13 |
| 2005/0081115 A1 | 4/2005 | Cheng et al. |

FOREIGN PATENT DOCUMENTS

| | | |
|---|---|---|
| JP | 06-236299 | 8/1994 |
| WO | WO 00/76119 A1 | 12/2000 |
| WO | WO 05/031575 A | 4/2005 |

OTHER PUBLICATIONS

International Search Report for International Application No. PCT/IB2006/003815 dated May 23, 2007.

International Search Report for International Application No. PCT/IB2004/003089 dated Mar. 21, 2005.

\* cited by examiner

FIG. 5   204 (CONTINUED)

METHOD AND APPARATUS FOR DETECTING A FAULT CONDITION AND RESTORATION THEREAFTER USING USER CONTEXT INFORMATION

FIELD OF THE INVENTION

The invention generally relates to detecting fault conditions, and, more specifically using a co-processing unit to detect a fault condition in a processing unit and further using the co-processing unit to restore the processing unit in response thereto using stored pre-fault user context information.

BACKGROUND OF THE INVENTION

Computing systems are generally composed of, among other things, integrated circuits (ICs) and a variety of other electronic components such as, but not limited to state machines, application specific integrated circuits (ASICs), logic gates and discrete logic devices. Like most electronic devices, these components are susceptible to electrostatic discharges and other events which act to transfer (i.e., discharge) electric charge due to an electrostatic and/or electromagnetic event (collectively, discharging events). If strong enough, such discharging events act to place the component into an incorrect, bad or error state, thereby rendering the element at least temporarily non-operational. In other words a fault has occurred. While some system designers have provided devices for protecting or shielding system components from discharging events, it is not uncommon for manufacturers to either not use an adequate shield or to employ ineffective protection mechanisms to ensure against such events. In some instances, the manufacturing design decision may be dictated by the functionality of the device, the size or physical characteristics of the device or simple economics. In any event, computing systems are and will continue to be susceptible to a variety of discharging events that result in a fault (i.e., a non-operational condition).

Mobile devices are particular susceptible to discharging events and possible faults due to the nature of their use. For instance, a mobile device is, by definition, small and portable. Users are enabled with the freedom to travel great distances and traverse a variety of environments with the device in hand. Consequently, movement by a user may generate a build up of charge on the user's body or clothing. In touching or coming close to the mobile device, the user may act as a conduit thereby transferring the charge to the mobile device and likely rendering it non-operational. It is further recognized, however, that non-mobile computer systems such as desktop computers, set top boxes or other computing systems may also be susceptible to discharging events and possible faults in similar situations where charge is transferred to such systems by an operator.

As is generally appreciated by one of ordinary skill in the art, a computing system such as a mobile telephone or other handheld device may include two processing units, a central processing unit (CPU) and a graphics processing unit (GPU). The CPU is coupled to the GPU via a north bridge, a south bridge, any suitable bus or buses or any combination thereof to pass drawing commands and other operation commands or instructions for subsequent execution. The GPU may be associated with a plurality of registers, a frame buffer and a graphics processor. The CPU may similarly be associated with a plurality of individual components and is coupled to system memory for storage of, among other things, executable instructions and operational data. In one embodiment, a variety of drivers and other software modules may be stored in system memory for execution on the CPU.

The CPU of most mobile devices is generally shielded to protect it and its related electronic components from susceptibility to discharging events. However, due to a variety of manufacturing and engineering-related design decisions, it is common for a GPU of a mobile device to be inadequately protected. Consequently, upon a discharging event, it has been discovered that the GPU and at least one or more of its related electronic components is placed in a bad or non-operational state. For instance, it is recognized that GPU registers are particularly susceptible to a faults and need to be rebooted for subsequent operation.

While prior art solutions exist to detect a fault condition (i.e., any condition indicating a fault) associated with a GPU and to restore the GPU to a workable state, no known solution exists where restoration of the processing unit returns it to a known, workable state for seamless or near seamless operation. For instance, it is known to detect a discharging event and subsequent fault condition by monitoring certain registers of the GPU using a driver executed by the CPU. The known prior art generally operates by rebooting both the GPU and GPU driver effected by the fault. However, by rebooting the GPU, user context information obtained during normal operation of the GPU driver is lost. Thus, the operating system of the CPU and other clients/applications issuing commands for execution by one of the CPU and the GPU need to generate new user context information before execution. Generally, this requires a user to initiate another instance of the software modules/drivers that were previously running before detection of the fault condition. Both those of ordinary skill in the art and common users of computing devices understand this results in lost data and user dissatisfaction with their computing device.

Therefore, a need exists for a fault detection and restoration method and apparatus for use in a computing system where drivers, clients and other applications running on the co-processing unit are not affected by the fault condition associated with the processing unit. A further need exists for restoring the computing system such that the affected portion thereof is returned to a known, useable state. Accordingly, neither the operating system or clients/applications utilizing the processing unit would be affected by the discharging event. Instead, they would remain operational with minimal impact on the user's experience with the computing system. As explained, such a method and apparatus would provide a near-seamless method for recovery after the detection of a fault condition.

BRIEF DESCRIPTION OF THE DRAWINGS

The invention will be more readily understood in view of the following description when accompanied by the below figures and wherein like reference numerals represent like elements.

DETAILED DESCRIPTION OF THE PRESENT EMBODIMENTS

Figure 1:
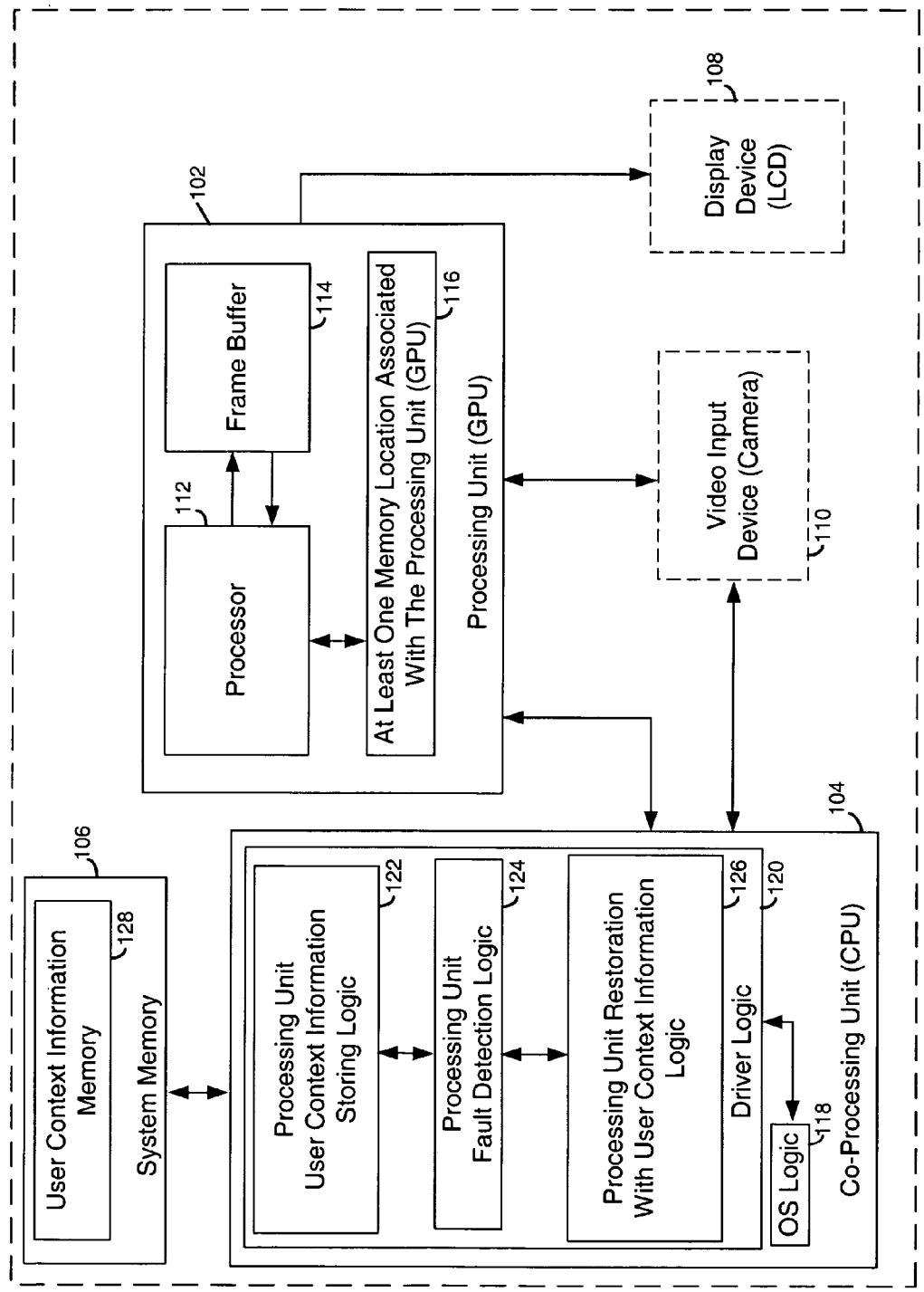
FIG. 1 is a block diagram illustrating one example of a system for detecting a fault condition associated with a processing unit and restoring the processing unit in accordance with one embodiment of the present disclosure.

Generally, the present disclosure provides a system including a processing unit and a co-processing unit in a computing environment where the processing unit is used to detect a fault condition associated with the co-processing unit and, upon detection, restore the processing unit using stored user context information. During normal operation, user context information is stored by the co-processing unit where user context information includes, for example, state information relating to whether the processing unit and its related components and devices are in an "on" or "off" condition, other configuration information used to support the utilization and functionality of the processing unit and its related components and devices. In addition user context information may include information indicating which resources are to be used in executing a specific operation command, where the resources are located, and other information associated with the processing unit memory locations. A fault condition associated with the processing unit is detected when at least a portion of the processing unit is rendered non-operational due to a discharging event, such as an electrostatic discharge. The co-processing unit may detect a fault condition by identifying information indicative of a fault condition after checking at least one memory location associated with the processing unit.

Upon detection, the co-processing unit restores the processing unit using the stored user context information thereby bringing the co-processing unit and its associated components back into a known, workable state without having to reboot any related drivers associated with the processing unit or without having to reboot any other clients running on the processing unit and interacting with the co-processing unit. The user context information may be used to match the current (i.e., post-fault detection) state information of one of the processing unit, a display associated with the processing unit and one or more circuits associated with the processing unit to the pre-fault detection state information of the same device or circuit. Matching the post-fault state information to the pre-fault state information may include writing the necessary portion of the stored user context information to at least one memory location or register when an operation command is issued requiring the use of the at least one memory location.

In one embodiment, the co-processing unit includes, among other things, driver logic for implementing the presently disclosed method. In another embodiment, the co-processing unit is capable of executing software modules residing in memory where the modules contain stored instructions, that when executed, perform equivalent methods.

Among other benefits, the present disclosure provides a method and apparatus for detecting a fault condition associated with a processing unit and restoring the processing unit using user context information. By storing the user context information, the driver, and other clients and applications associated with, or interacting with the processing unit do not need to be rebooted or reinitialized. Therefore, the restoration method provides a near seamless process in terms of its efficiency, speed and functionality when compared to known prior art solutions.

FIG. 1 is a block diagram illustrating one example of a system 100 including at least a processing unit 102, a co-processing unit 104 and memory 106 in accordance with one embodiment of the present disclosure. It is contemplated that system 100 may be associated with one or more larger computer systems (not shown). System 100 may also include at least one display device 108 coupled, directly or indirectly, to the processing unit such that the display device 108 is capable of receiving control information and display information from the processing unit 102 for subsequent display. System 100 may also include at least one video input device 110 such as a camera or other source of video information. The video input device 110 is coupled, directly, or indirectly, to the processing unit 102 and the co-processing unit 104 using any suitable means whereby control and other video information may be transmitted to and from the processing unit 102 and the co-processing unit 104. Processing unit 102 is coupled to the co-processing unit 104, directly or indirectly, using a north bridge, a south bridge, at least one bus or any suitable combination to effectuate adequate communication therebetween. Similarly, co-processing unit 104 is coupled to memory 106, directly or indirectly, by at least one bus or any other suitable data transfer structure or structures to effectuate adequate communication.

In one embodiment, the processing unit 102 may be a graphics processing unit (GPU) or any other suitable processing unit of system 100 where the processing unit 102 is manufactured with or composed of one or more integrated circuits (ICs), discrete logic devices, state machines, application specific integrated circuits (ASICs) or any other suitable structure or structures. It is further contemplated that the components comprising the processing unit 102 may be disposed on one or more physical cards for use in system 100. Processing unit 102 includes a processor 112 coupled to a frame buffer 114, and at least one processing unit memory location 116 also coupled to the processor 112. It is contemplated that the processor 112 may include at least one processing device such as, but not limited to, any suitable distributed or non-distributed processing or microprocessing device as commonly found in a graphics processing unit or any other processing unit. In one embodiment, processor 112 is a graphics processor or rendering engine capable of, among other things, executing drawing commands for display on display device 108. It is similarly contemplated that frame buffer 114 and the at least one memory location associated with the processing unit 116 may be any suitable memory device or memory devices such as but not limited to volatile and non-volatile memory, random access memory (including, e.g., RAM, DRAM, SRAM), ROM-based memory (including, e.g., ROM, PROM, EPROM, EEPROM) and flash memory. In one embodiment, the at least one memory location associated with the processing unit 116 includes a plurality of dedicated general purpose registers for use with processor 112.

Co-processing unit 104 may be a central processing unit (CPU) or any other suitable processing unit of system 100. Minimally, co-processing unit 104 includes operating system (OS) logic 118 and driver logic 120 where driver logic 120 corresponds to the device driver associated with the processing unit 102. For instance, driver logic 120 may correspond to a GPU driver. The individual components of co-processing unit 104, such as OS logic 118 and driver logic 120, may include any suitable structure or structures for carrying out a variety of logical functions relating to the operating system and device/processing unit to which the driver corresponds (e.g., processing unit 102). For instance, OS logic 118 and driver logic 120 may be implemented using, for example, one or more integrated circuits (ICs), discrete logic devices, state machines, application specific integrated circuits (ASICs), or any other suitable device or devices. It is contemplated that the components comprising the co-processing unit 104 may be disposed on one or more physical cards for use in system 100.

In one embodiment, driver logic 120 may include processing unit user context information storing logic 122 capable of storing user context information associated with the processing unit 102, processing unit and fault detection logic 124 capable of detecting a fault condition associated with the processing unit 102, and processing unit restoration with user context information logic 126 capable of restoring processing unit 102 using the stored user context information. OS logic 118 and driver logic 120 are coupled to each other while individual logic components 122-126 are similarly coupled to each other by any suitable means to provide communication therebetween and also between the above-stated system components 102, 104, 106, 108, 110. For purposes of illustration, logic components 122-126 are depicted as three separate logic components within driver logic 126 suitably coupled to each other to effectuate the necessary flow of data and information. However, it is contemplated that logic components 122-126 may be combined to form a single logic component or any number of logic components, without departing from the spirit or scope of the present disclosure.

Memory 106 may be distributed or non-distributed memory or any other suitable form of memory including, but not limited to, volatile and non-volatile memory, random access memory (including, e.g., RAM, DRAM, SRAM), ROM-based memory (including, e.g., ROM, PROM, EPROM, EEPROM) and flash memory. It is further contemplated that memory 106 may correspond to any suitable external memory device or devices capable of interacting with at least co-processing unit 104. Memory 106 is capable of storing, among other types of information necessary to effectuate the functions of system 100, user context information as indicated by user context information memory 128. In one embodiment, memory 106 corresponds to system memory.

As understood by one having ordinary skill in the art, the co-processing unit 104 functions to, among other things, send drawing commands and other operation commands to the processing unit 102. The variety of operation commands may originate with a source such as the operating system of the co-processing unit 104, or any number of clients or applications running on the co-processing unit 104. The operation commands may include, among other information, user context information that is utilized by the processing unit 102 to carry out the requested operation present in the command. User context information for each operation command is generally created by at least driver logic 126 and may contain, for example, information indicating which resources (e.g., textures stored in memory) are to be used in executing the operation command, where the resources are located (e.g., the address or a pointer to the address) and other information (e.g., memory location data for use in performing a specific operation command) associated with the processing unit memory locations 116. As is also generally understood, user context information may correspond to a specific user context associated with a particular client or application running on the co-processing unit 104. Generally user context information is restored by driver logic 126 during normal operation and maintained in memory 106 for subsequent use in later operation commands associated with the same source of operation commands. In one embodiment, the processing unit user context information storing logic 122 performs this function in addition to others relating to the storage, maintenance and retrieval of user context information in memory 106.

As described above, many systems such as system 100 include adequate shielding and protection against discharging events for the co-processing unit 104 while ignoring or providing a lower level of protection for processing unit 102. Consequently, during a discharging event, at least a portion of system 100 (e.g., co-processing unit 104) safely absorbs the shock and continues operation without error. However, in many discharging events, processing unit 102 and one or more of the processing unit memory locations 116 are placed into an incorrect, bad or error state rendering at least a portion of the processing unit 102 non-operational.

Figure 2:
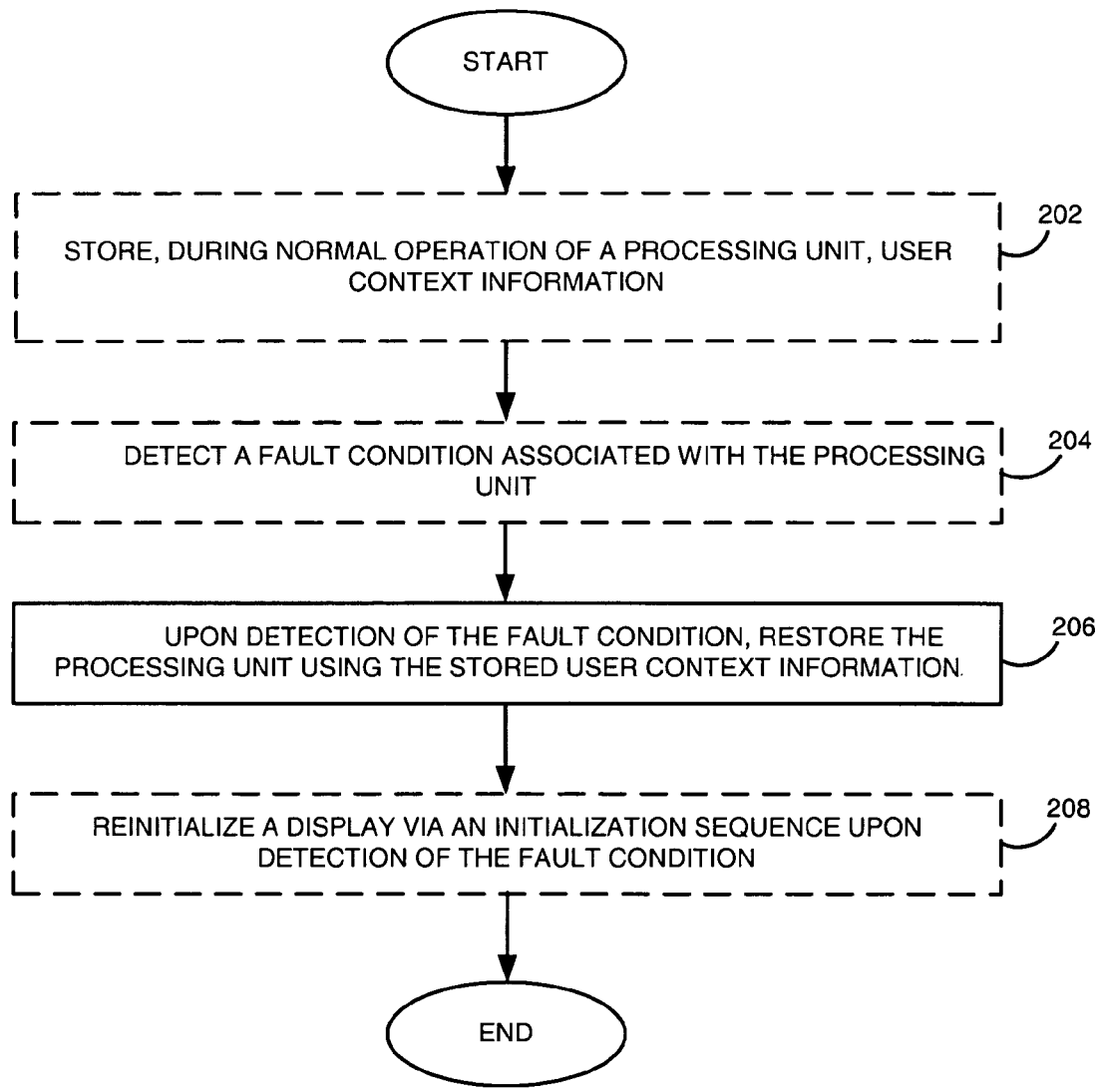
FIG. 2 is a flow chart illustrating one example of the method for detecting a fault condition and restoring a processing unit in accordance with one embodiment of the present disclosure.

FIG. 2 is a flowchart illustrating one example of a method for detecting a fault and restoring a processing unit thereafter. The method begins in block 206 where, upon detection of a fault condition, the processing unit is restored using the stored user context information. In one example, this may correspond to utilizing the processing unit restoration with user context information logic 126 of FIG. 1 to restore the processing unit 102 into a known and workable state. Inherently, the method of block 206 subsumes two other methods as illustrated in dashed blocks 202 and 204. In block 202, user context information is stored during normal operation of the processing unit. In one example, the specific portion of the method enumerated in block 202 can be implemented using the processing unit user context information storing logic 122 associated with driver logic 120 of co-processing unit 104 as shown in FIG. 1. During normal operation of the processing unit 102, the processing unit user context information storing logic 122 stores the user context information used for execution of command operations by the processing unit 102. Returning to the method of FIG. 2, in block 204, a fault condition associated with the processing unit is detected. For purposes of example, the fault condition detection may be performed by the processing unit fault detection logic 124 of FIG. 1. Lastly, the method of FIG. 2 may include, as illustrated in block 208, reinitializing a display via an initialization sequence upon detection of the fault condition. In accordance with system 100 of FIG. 1, this may be performed, in one example, by sending appropriate control information from the processing unit 102 to the display device 108 for reinitialization. Upon conclusion, the method ends.

Figure 3:
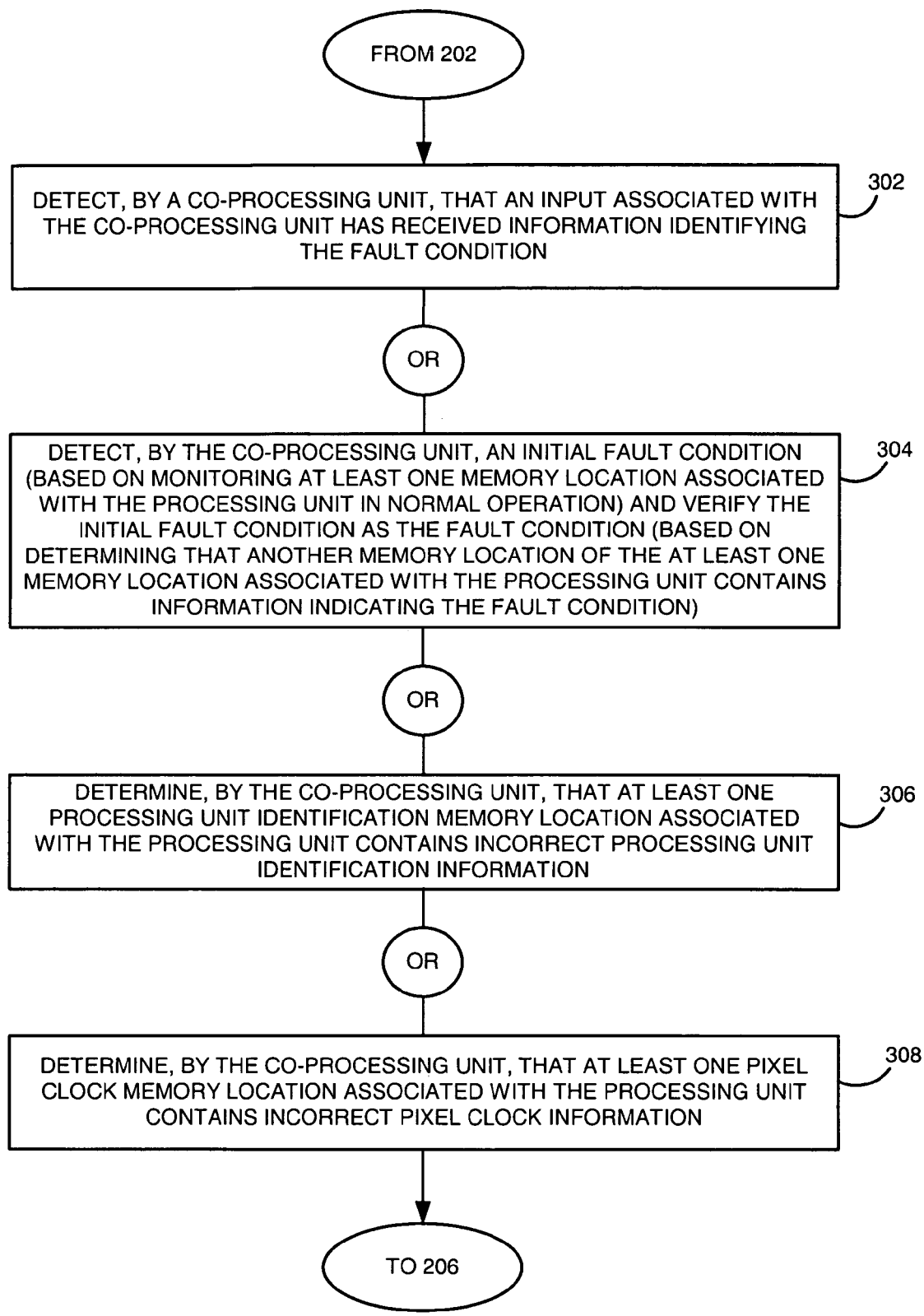
FIG. 3 is a flow chart illustrating one example of detecting a fault condition associated with a processing unit in accordance with the method of FIG. 2.

FIG. 3 is a flowchart illustrating one example of detecting a fault condition associated with a processing unit as indicated in block 204 of FIG. 2. As illustrated, the method may include one or more of at least four different routines illustrated as method blocks 302-308. In one instance, a fault condition is detected by using a co-processing unit to detect that an input associated with the co-processing unit has received information identifying the fault condition as indicated in block 302. This may correspond to, in one example, utilizing the co-processing unit 104 of FIG. 1, and more specifically a general purpose input/output (GPIO) pin or port associated with a processor (not shown) of the co-processing unit to detect information identifying the fault condition. In one embodiment, the GPIO pin may be coupled to a display such as display device 108 of FIG. 1 and thus is designed to be particularly sensitive to discharging events and subsequent faults. For example, upon a discharging event, the system 100 as illustrated in FIG. 1 may receive a transfer of charge from a user or any other object whereby the transferred charged particles are received at the GPIO pin via display device 108. In one embodiment, the GPIO pin may see a toggled state, or any other signal or information indicating the fault condition.

The method of FIG. 3 may also include detecting, by the co-processing unit an initial fault condition based on monitoring at least one memory location associated with the processing unit in normal operation and verifying the initial fault condition as the fault condition based on determining that another memory location associated with the processing unit contains information indicating the fault condition, as illustrated in block 304. For purposes of illustration, this alternative may correspond to using the co-processing unit 104 more specifically, the processing unit fault detection logic 124 to monitor at least one operation command-specific memory location of the at least one memory location associated with the processing unit 116. In one example, this may correspond to monitoring a known register associated with the processing unit 102. Upon execution of an operation command by the processing unit 102, at least one operation command-specific memory location of the at least one memory location associated with the processing unit 116 will generally receive and store new information reflecting, among other things, completion of the operation. In the event that information indicating completion is not received by, saved in or written to the correct memory location, the processing unit fault detection logic 124 detects an initial fault condition. At that point, the processing unit fault detection logic 124 will verify the initial fault condition as the fault condition by checking at least another memory location associated with the processing unit 116 (e.g., at least one predetermined memory location known to be particularly susceptible to discharging events and faults). This may correspond to checking one or more memory locations that are not related to the "unsuccessful" operation command (i.e., memory locations that are not used to execute the operation command). If the information contained in the at least another memory location associated with the processing unit 116 checked by the processing unit fault detection logic 126 is either incorrect or unreadable, or otherwise invalid, the processing unit fault detection logic 124 concludes that the initial fault condition is the fault condition.

Alternatively, the method of block 204 may include determining, by the co-processing unit, that at least one processing unit identification memory location associated with the processing unit contains incorrect processing unit identification information, as indicated by block 306. In one example, this may include utilizing the processing unit fault detection logic 124 to check at least one of the processing unit memory locations 116 identified as a processing unit identification memory location where the processing unit identification information contained therein is held for purposes of communication with, among other devices, the co-processing unit 104. In the event that the information contained in the at least one processing unit identification memory location is incorrect, unreadable, or otherwise invalid, a fault condition is detected. Finally, the method of FIG. 3 may include determining, by the co-processing unit, that at least one pixel clock memory location associated with the processing unit contains incorrect pixel clock information as indicated in block 308. Similar to the method of block 306 where the method included determining, by the co-processing unit, that at least one of the processing unit identification memory locations 116 contained incorrect information, the processing unit fault detection logic 124 may similarly identify and check at least one pixel clock memory location associated with the processing unit memory locations 116 of FIG. 1 to determine whether or not the pixel clock information stored therein is correct. If the information is incorrect, a fault condition is detected.

Figure 4:
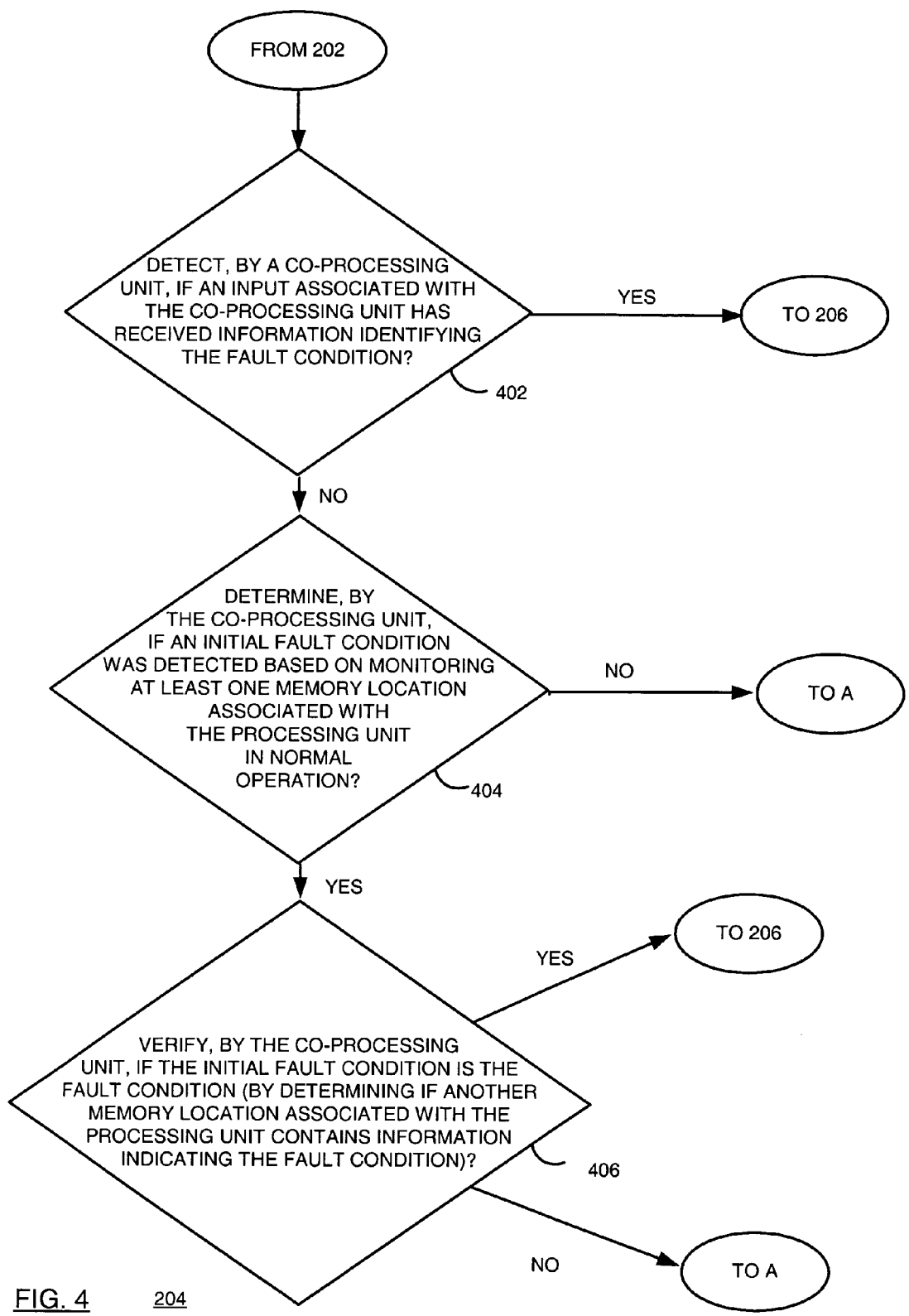
FIG. 4 is a first portion of a flow chart illustrating another example of a method of detecting a fault condition associated with a processing unit for use in the method of FIG. 2.

FIG. 4 is a flowchart illustrating another example of detecting a fault condition associated with a processing unit in accordance with the method of FIG. 2. Generally, the method of FIG. 4 follows the method of FIG. 3. However, the method as illustrated in FIG. 4 illustrates a more dynamic method of detecting a fault condition in accordance with block 204 of FIG. 2. For instance, the method of FIG. 4 may be implemented as one or more routines where the logic components described above are utilized to implement the one or more routines. The method begins with decisional block 402 where it is determined, by a co-processing unit, if an input associated with the co-processing unit has received information identifying the fault condition. If such information has been received, the method proceeds to block 206 in accordance with FIG. 2, where the processing unit is restored using the stored user context information. In one embodiment, block 402 may be implemented by the processing unit fault detection logic 124 and may correspond to a particular time out period. For example, the processing unit fault detection logic 124 may "listen" during the duration of any suitable time out period (e.g., 800 ms) for a state change or other received information on a GPIO pin of the processor (not shown) associated with the co-processing unit where the state change or other received information indicates a fault condition. If the co-processing unit has received fault identifying information, a fault condition has been verified.

Alternatively, if no such information is received, the method continues in decisional block 404 where it is determined, by the co-processing unit, if an initial fault condition was detected based on monitoring at least one memory location associated with the processing unit in normal operation. Decisional block 404 is similar to the first portion of method block 304 and may be carried out using the processing unit fault detection logic 124 as described above. In one embodiment, the processing unit fault detection logic 124 uses a similar time out period (e.g., 800 ms) such that if an operation command does not cause at least one memory location associated with the processing unit 116 (e.g., registers) to store information (e.g., a bit) indicating the completion of the operation command within the time-out period, it may be determined that an initial fault condition exists. If, however, information was stored indicating the completion of the operation command, it may be determined that no initial fault condition exists. The basis for this determination is the fact that one cause of an "incomplete" operation command may be a discharging event. The determination is "initial" because the mere fact that the determination is made does not, by itself, indicate a fault condition as defined above.

Figure 5:
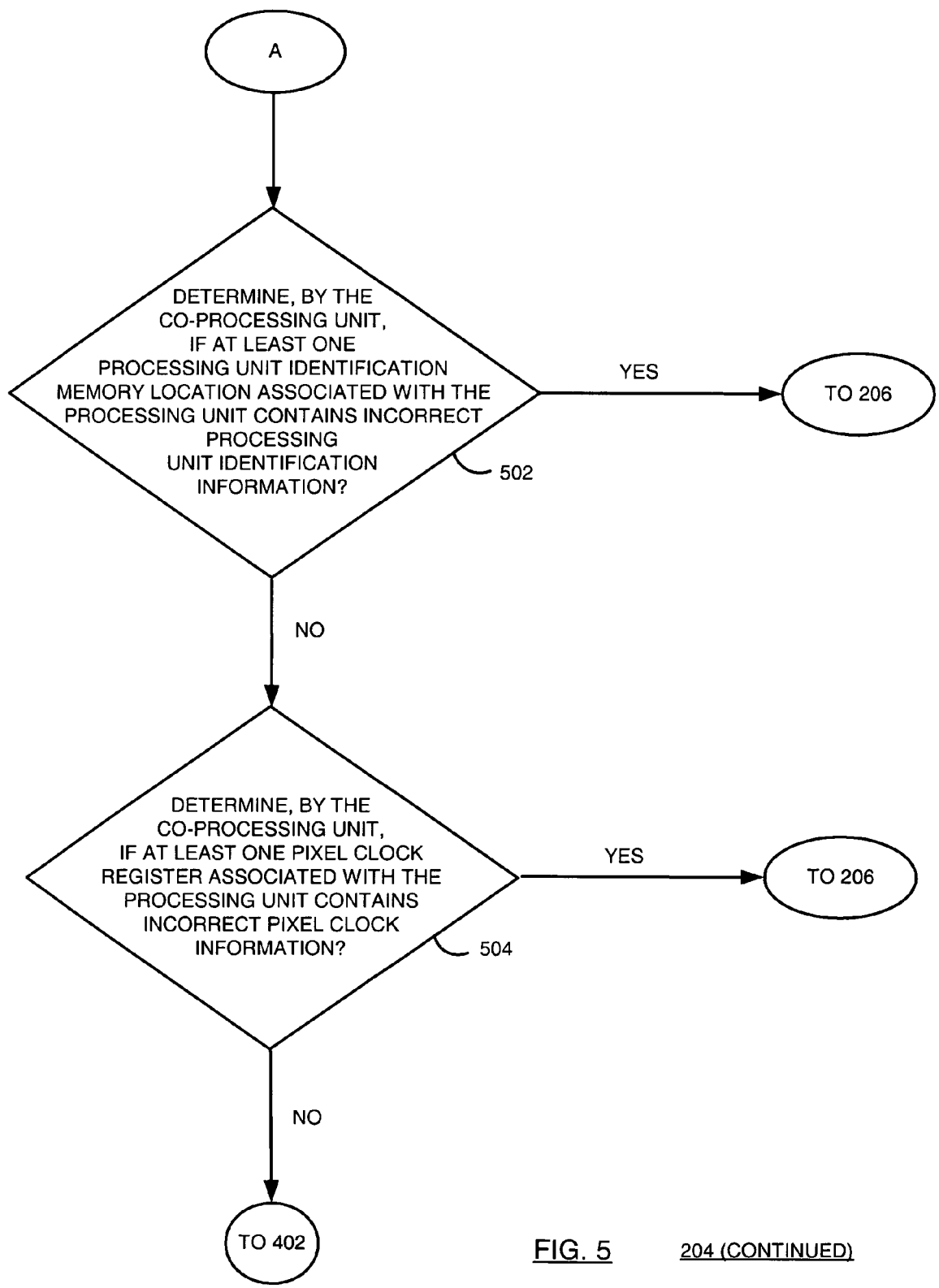
FIG. 5 is a last portion of the method of FIG. 4.

If no initial fault condition was detected, the method proceeds to decisional block 502 of FIG. 5, according to reference alpha-numeral A. However, if it was determined that initial fault condition was detected, then the method continues in decisional block 406 where it is determined if the initial fault condition is the fault condition by a verification process involving the co-processing unit. Decisional block 406 is substantially similar to the second portion of method block 304 of FIG. 3 and is similarly carried out by processing unit fault detection logic 124. If the initial fault condition is verified as the fault condition, the method continues to block 206 of FIG. 2, for restoration of the processing unit. Alternatively, if the initial fault condition is not the fault condition, then the method continues to decisional block 502 of FIG. 5 according to alpha-numeral A.

In one embodiment, blocks 404 and 406 may be implemented in a continually running routine separate from the remainder of the blocks of FIGS. 4 and 5, the processing unit detection logic 124 may set a fail flag to indicate that the initial fault condition is the fault condition. For example, the fail flag may correspond to a variable in memory 106 or at least one bit in any other suitable memory location (not shown). Thus, blocks 404 and 406 may include checking the appropriate memory location for the presence of the fail flag.

As indicated above, FIG. 5 is a second portion of the method of FIG. 4 and begins with decisional block 502 where it is determined by the co-processing unit if at least one processing unit identification memory location associated with the processing unit contains incorrect processing unit identification information. If the information contained in the at least one processing unit identification memory location is incorrect, the method continues to block 206 of FIG. 2 for restoration. Alternatively, the method proceeds to decisional block 504 where it is determined, by the co-processing unit, if at least one pixel clock register associated with the processing unit contains incorrect pixel clock information. If the at least one pixel clock register contains incorrect pixel clock information, the method proceeds to block 206 of FIG. 2. Alternatively, the method returns to decisional block 402 to reinitiate the routine or routines associated with block 204 of FIG. 2. Decisional blocks 502 and 504 may be implemented in the manner indicated above with respect to method blocks 306 and 308. In this manner, one of ordinary skill in the art will appreciate that the processing unit fault detection logic 124 of FIG. 1 may utilize one or more routines that are continuously executing on the co-processing unit 104 to determine whether a fault condition associated with the processing unit 104 has been detected.

It is contemplated that any suitable mechanism may be used to trigger the restoration method of block 206. For instance, if any of the decisional blocks in FIGS. 4 and 5 detect or determine a fault condition, a fault flag similar to the fail flag may be set by the processing unit fault detection logic 124 in a suitable location of memory 106 thereby indicating to the processing unit restoration with user context information logic 126 that restoration must take place. Alternatively, a fault flag may be at least one bit in any other suitable memory location (not shown) to indicate the same.

Figure 6:
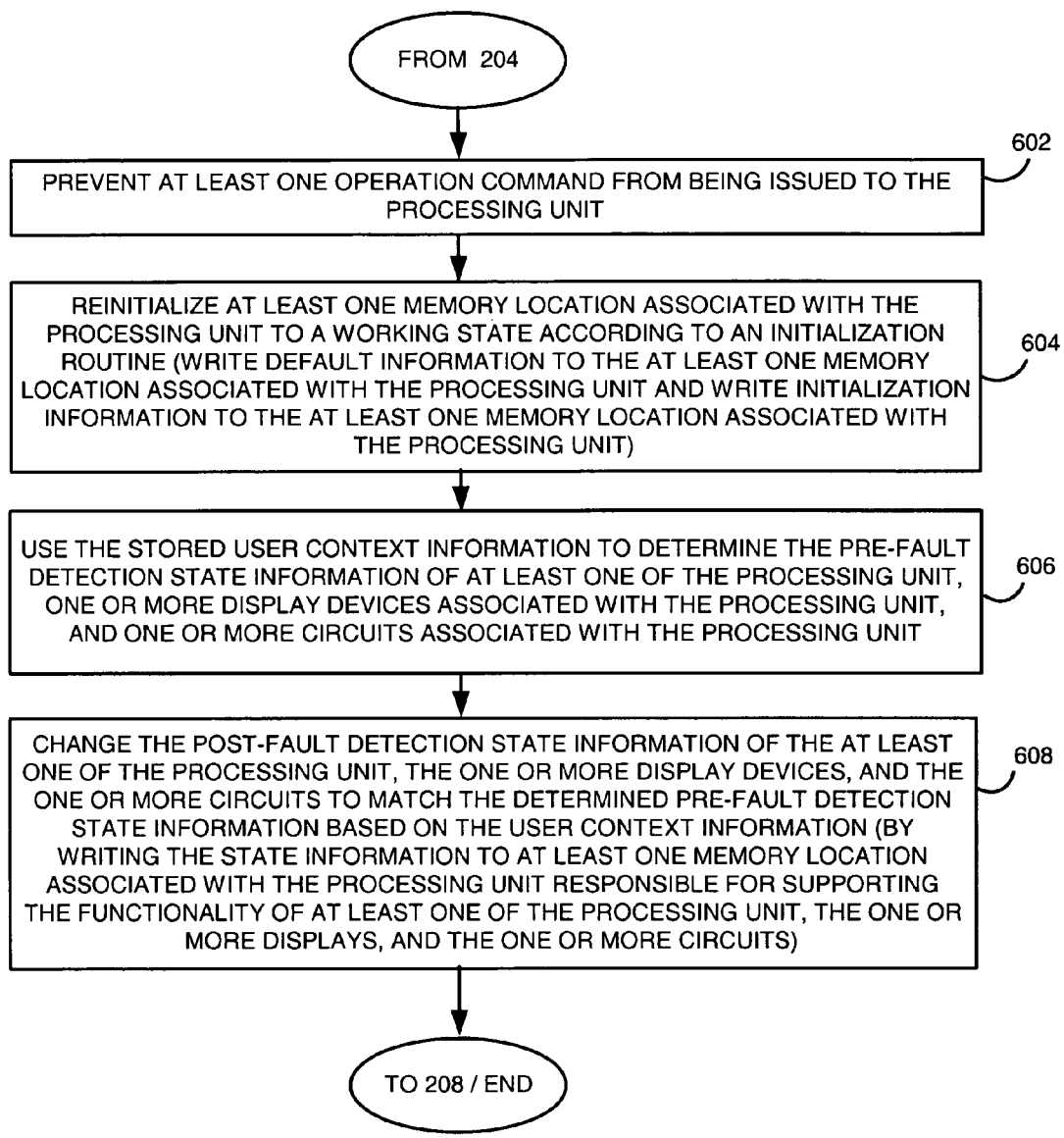
FIG. 6 is a flow chart illustrating one example of restoring the processing unit using stored user context information in accordance with the method of FIG. 2.

FIG. 6 is a flowchart illustrating one example of a method for, upon detection of the fault condition, restoring the processing unit 102 in accordance with FIG. 2. The method begins in block 602 where upon detection of the fault condition, at least one operation command is prevented from being issued to the processing unit. For purposes of illustration, this may correspond to utilizing the processing unit restoration with user context information logic 126 as indicated in FIG. 1 to prevent at least one command from being issued to the processing unit 102 by any client, application or other device. Where driver logic 120 is utilized to execute instructions stored in memory (See FIG. 7 where the driver is a software module), this method may be implemented by obtaining all mutual exclusion objects (mutexes) that allow clients, applications and other devices from accessing, reading from or writing to the processing unit 102. One of ordinary skill in the art will appreciate that an operating system may utilize one or more mutex objects to provide access rights to a shared resource. For example, if one process, thread or application is assigned a mutex object to access the shared resources associated with processing unit 102, no other process, thread or application may access that particular shared resource.

The method continues in block 604 where at least one memory location associated with the processing unit is reinitialized to a working state according to an initialization routine. In one embodiment, the reinitialization method as indicated in block 604 may include writing default information to the at least one memory location associated with the processing unit and then writing initialization information to the at least one memory location of the processing unit. For purposes of example, this may correspond to using the processing unit restoration with user context information logic to reset the processor 112 of processing unit 102 by toggling the state associated with a known reset pin or port of the processor 112 and utilizing any number of initialization routines that are well known in the art to write default values to the at least one memory location associated with the processing unit 116. At this point, one of ordinary skill in the art may recognize that the at least one memory location is not yet in a workable state. Thus, the processing unit restoration with user context information logic 126 may be utilized to populate or write initialization information to the at least one memory location associated with the processing unit 116 according to an initialization routine, thereby placing the at least one memory location associated with the processing unit 116 into a workable state. It may be recognized that the implementation of method block 604 may correspond to established routines utilized during boot-up of system 100.

The method continues with block 606 where the stored user context information is used to determine the pre-fault detection state information associated with at least one of the processing unit, one or more display devices associated with the processing unit, and one or more circuits associated with the processing unit. It is appreciated that a circuit may be constructed using any form of technology and thus, may include, for example, ICs, ASICs, state machines, discrete logic components or any other electronic components. One of ordinary skill in the art will appreciate that state information may include whether the processing unit, the one or more display devices or the one or more circuits are in an "on" or "off" condition, and any other configuration information used to support the utilization and functionality of the processing unit, the one or more display devices or the one or more circuits. For instance, the one or more circuits associated with processing unit 102 may include any digital signal processor (DSP) such as, but not limited to, a video encoder/decoder and an audio encoder/decoder. It is contemplated, however, that any other circuit associated with the processing unit 102 may be configured in accordance with blocks 606 and 608 of FIG. 6.

In one embodiment, the method described in block 606 may be carried out utilizing the processing unit restoration with user context information logic 126 and memory 106. More specifically, the processing unit restoration with user context information logic 126 may be utilized to cycle through the stored user context information located in user context information memory 128 of FIG. 1 (i.e., stored within memory 106) to determine the pre-fault detection state information of at least one of the processing unit 102, one or more display devices associated with the processing unit 108, and one or more circuits associated with the processing unit 102. For example, in determining whether one or more display devices associated with the processing unit 102 were in an "on" condition, the processing unit restoration with user context information logic 126 may examine the stored user context information in memory 128 to determine if any application or client generated user context information (prior to fault detection) indicating that the one or more display devices should be in an "on" condition.

Upon determination of the pre-fault detection state information, the method concludes in block 608 where the post-fault detection state information of the at least one of the processing unit, one or more displays, and one or more circuits is changed to match the determined pre-fault detection state information based on the stored user context information. In one embodiment, the post-fault detection state information is changed to match the determined pre-fault detection state information by writing the state information to at least one memory location associate with the processing unit responsible for supporting the functionality of at least one of the processing unit, one or more displays, and one or more circuits. In this example, the processing unit restoration with user context information logic 126 may be used to write the state information to the corresponding at least one memory location associated with the processing unit 116. In another embodiment, the processing unit restoration with user context information logic 126 may write the state information to the corresponding memory location only when an operation command is issued requiring the use of the at least one memory location. In other words, in this example, the post-fault detection state information is not changed until an application or client executing on the processing unit 102 generates a command operation requiring the functionality associated with the at least one memory location.

Figure 7:
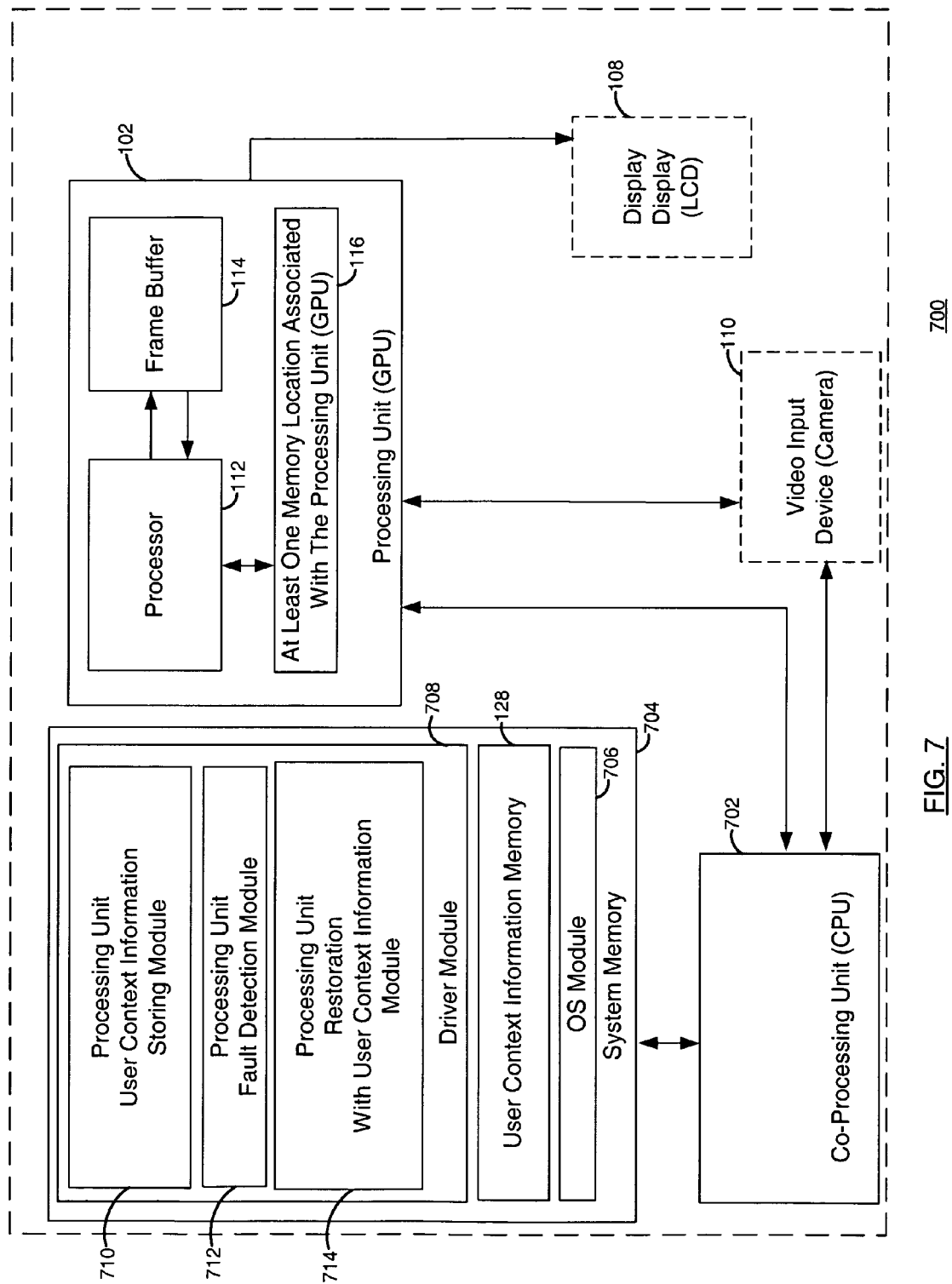
FIG. 7 is a block diagram illustrating a second example of a system for detecting a fault condition associated with a processing unit and restoring the processing unit thereafter, in accordance with a second embodiment of the present disclosure.

FIG. 7 is an alternate example of a system 700 for detecting a fault condition associated with a processor and restoration thereof upon detection of the fault condition. Like system 100, system 700 includes a processor 102 and may include a display device 108 and a video input device 110 coupled therebetween in the same manner as described above in FIG. 1. Similarly, system 700 includes a co-processing unit 702 coupled to a memory (such as system memory) 704 and to processor 102, display device 108 and video input device 110 in the manner illustrated in FIG. 1 with respect to co-processing unit 104 and memory 106. Memory 704 comprises, among other things, an OS module 706, a driver module 708 and user context information memory 128. Additionally, driver module 708 includes a processing unit user context information module 710, a processing unit fault detection module 712 and processing unit restoration with user context information module 714. Collectively, the modules listed above 706-714 include stored instructions such that when executed by the co-processing unit 702 cause the co-processing unit 702 to perform the same functions and operations as corresponding logic components 118-126 of FIG. 1 as described above. Thus it is contemplated that the system for detecting a fault in a processing unit and restoration thereof using stored user context information may be implemented in any combination of hardware and software electronic components.

Accordingly, the methods and apparatuses described above with respect to FIGS. 1-7 incorporate the restoration of a co-processing unit upon detection of a fault condition using stored user context information. Because information contained within the user context information is indicative of the state of the processing unit and its related circuits prior to fault detection, the power state of the processing unit may be restored. By changing the post-fault detection state information of at least one of the processing unit, one or more display devices, and one or more circuits to match the determined pre-fault detection state information based on the user context information, the processing unit 102 is quickly restored to its pre-fault condition. In other words, the processing unit 102 is restored to a known and workable condition or state such that the user of the system (e.g., system 100) is minimally effected by the fault condition. By storing the user context information and maintaining it after fault detection, it can be used to restore the non-operational processing unit 102 without rebooting or reinitializing the clients, applications and drivers running on the processing unit. Thus a near seamless recovery process is achieved.

The above detailed description of the invention and the examples described therein have been presented for the purposes of illustration and description only and not by limitation. It is therefore contemplated the present invention cover any and all modifications, variations, or equivalents that fall in the spirit and scope of the basic underlying principles disclosed above and claimed herein.

What is claimed is:

1. A method comprising:
   storing, by a co-processing unit during normal operation of a processing unit, user context information;
   issuing, with the co-processing unit during the normal operation of the processing unit, operation commands to the processing unit that request the processing unit to perform requested operations different from operations performed by the co-processing unit, wherein one or more of the operation commands includes at least a portion of the user context information; and
   upon detection of a fault condition associated with the processing unit, restoring, by the co-processing unit, the processing unit using the stored user context information.

2. The method of claim 1, wherein detection of the fault condition comprises at least one of:
   detecting, by the co-processing unit, that an input associated with the co-processing unit has received information identifying the fault condition; and
   detecting, by the co-processing unit, that at least one memory location associated with the processing unit contains information indicating a fault condition.

3. The method of claim 2 wherein detecting that at least one memory location contains information indicating a fault condition comprises at least one of:
   detecting, by the co-processing unit, an initial fault condition based on monitoring at least another memory location associated with the processing unit in normal operation and verifying, by the co-processing unit, that the initial fault condition is the fault condition based on determining that the at least one memory location associated with the processing unit contains information indicating the fault condition;
   determining, by the co-processing unit, that at least one processing unit identification memory location associated with the processing unit contains incorrect processing unit identification information; and
   determining, by the co-processing unit, that at least one pixel clock memory location associated with the processing unit contains incorrect pixel clock information.

4. The method of claim 1, wherein restoring the processing unit comprises:
   preventing at least one of the operation commands from being issued to the processing unit; and
   reinitializing at least one memory location associated with the processing unit to a working state using an initialization routine.

5. The method of claim 4, wherein reinitializing the at least one memory location associated with the processing unit to a working state using an initialization routine comprises:
   writing default information to the at least one memory location associated with the processing unit; and
   writing initialization information to the at least one memory location associated with the processing unit.

6. The method of claim 1, wherein restoring the processing unit comprises:
   using the stored user context information to determine pre-fault detection state information of at least one of the processing unit, one or more display devices associated with the processing unit, and one or more circuits associated with the processing unit; and changing post-fault detection state information of the at least one of the processing unit, the one or more display devices, and the one or more circuits to match a determined pre-fault detection power state based on the stored user context information.

7. The method of claim 6, wherein changing the post-fault detection state information comprises writing at least a portion of the stored user context information to at least one memory location associated with the processing unit when one of the operation commands is issued requiring the use of the at least one memory location.

8. The method of claim 1 further comprising reinitializing a display via an initialization sequence upon detection of the fault condition.

9. The method of claim 1, wherein restoring the processing unit comprises, upon the detection of the fault condition associated with the processing unit, restoring, by the co-processing unit, the processing unit using the stored user context information without resetting one or more of a client, an application, and a driver executing on the processing unit.

10. The method of claim 1,
wherein the co-processing unit comprises a central processing unit (CPU) that is shielded from susceptibility to discharging events,
wherein the processing unit comprises a graphics processing unit (CPU) that is not shielded from susceptibility to the discharging events,
wherein storing the user context information comprises storing, by the CPU, the user context information, and
wherein restoring the processing unit comprises restoring, by the CPU, the GPU using the storing user context information.

11. A method comprising:
storing, by a co-processing unit during normal operation of the processing unit, user context information;
issuing, with the co-processing unit during the normal operation of the processing unit, operation commands to the processing unit that request the processing unit to perform requested operations different from operations performed by the co-processing unit, wherein one or more of the operation commands includes at least a portion of the user context information;
detecting, by the co-processing unit, a fault condition associated with a processing unit by at least one of:
detecting, by the co-processing unit, that an input associated with the co-processing unit has received information identifying the fault condition;
detecting, by the co-processing unit, an initial fault condition based on monitoring at least one memory location associated with the processing unit in normal operation and verifying the initial fault condition as the fault condition based on determining, by the processing unit, that at least another memory location associated with the processing unit contains information indicating the fault condition;
determining, by the co-processing unit, that at least one processing unit identification memory location associated with the processing unit contains incorrect processing unit identification information; and
determining, by the co-processing unit, that at least one pixel clock memory location associated with the processing unit contains incorrect pixel clock information; and
after detecting the fault condition, restoring, by the co-processing unit, the processing unit using the stored user context information by at least reinitializing at least one memory location of the processing unit to a working state using an initialization routine.

12. The method of claim 11, wherein restoring the processing unit comprises:
using the stored user context information to determine pre-fault detection state information of at least one of the processing unit, one or more display devices associated with the processing unit, and one or more circuits associated with the processing unit; and
changing post-fault detection state information of the at least one of the processing unit, the one or more display devices, and the one or more circuits to match a determined pre-fault detection power state based on the stored user context information.

13. The method of claim 12,
wherein changing the post-fault detection state information comprises writing at least a portion of the stored user context information to one or more of:
the at least one memory location associated with the processing unit,
the at least another memory location associated with the processing unit, and
at least yet another memory location associated with the processing unit, when one of the operation commands is issued requiring the use of the one or more of:
the at least one memory location associated with the processing unit,
the at least another memory location associated with the processing unit, and
the at least yet another memory location associated with the processing unit.

14. The method of claim 11 further comprising reinitializing a display via an initialization sequence upon detection of the fault condition.

15. An apparatus comprising:
a co-processing unit that stores, during normal operation of a processing unit, user context information, issues, during the normal operation of the processing unit, operation commands to the processing unit that request the processing unit to perform requested operations different from operations performed by the co-processing unit, wherein one or more of the operation commands includes at least a portion of the user context information, and, upon detection of a fault condition associated with the processing unit, restores the processing unit using the stored user context information.

16. The apparatus of claim 15 wherein the co-processing unit further detects that at least one of:
an input associated with the co-processing unit has received information identifying the fault condition; and
at least one memory location associated with the processing unit contains at least one stored bit indicating a fault condition.

17. The apparatus of claim 15 wherein the co-processing unit further uses the stored user context information to determine pre-fault detection state information of at least one of the processing unit, one or more display devices associated with the processing unit, and one or more circuits associated with the processing unit and changes post-fault detection state information of the at least one of the processing unit, the one or more display devices, and the one or more circuits to match a determined pre-fault detection power state based on the stored user context information.

18. The apparatus of claim 17 wherein the co-processing unit further writes at least a portion of the stored user context information to at least one memory location of the processing unit when one of the operation commands is issued requiring the use of the at least one memory location.

19. The apparatus of claim 15, wherein the co-processing unit, upon the detection of the fault condition associated with the processing unit, restores the processing unit using the stored user context information without resetting one or more of a client, an application, and a driver executing on the processing unit.

20. The apparatus of claim 15,
wherein the co-processing unit comprises a central processing unit (CPU), and
wherein the processing unit comprises a graphics processing unit (GPU),
wherein the CPU includes driver logic corresponding to the device driver associated with the GPU that enables the CPU to interface with the GPU to issue the operation commands.

21. The apparatus of claim 15, wherein the apparatus comprises a mobile device.

22. An apparatus comprising:
a processing unit; and
a co-processing unit operatively coupled to the processing unit and memory that contains stored instructions such that when executed by the co-processing unit, cause the co-processing unit to:
store, during normal operation of the processing unit, user context information;
issues, during the normal operation of the processing unit, operation commands to the processing unit that request the processing unit to perform requested operations different from operations performed by the co-processing unit, wherein one or more of the operation commands includes at least a portion of the user context information; and
restore the processing unit, upon detection of a fault condition associated with the processing unit, using the stored user context information.

23. The apparatus of claim 22 wherein the stored instructions that, when executed, cause the co-processing unit to detect the fault condition comprise stored instructions that, when executed, cause the co-processing unit to detect that at least one of:
an input associated with the co-processing unit has received information identifying the fault condition; and
at least one memory location associated with the processing unit contains at least one stored bit indicating a fault condition.

24. The apparatus of claim 22 wherein the stored instructions that, when executed, cause the co-processing unit to restore the processing unit using the stored user context information comprise stored instructions, that when executed, cause the co-processing unit to:
use the stored user context information to determine a pre-fault detection state information of at least one of the processing unit, one or more display devices associated with the processing unit, and one or more circuits associated with the processing unit; and
change post-fault detection state information of the at least one of the processing unit, the one or more display devices, and the one or more circuits to match a determined pre-fault detection power state based on the stored user context information.

25. The apparatus of claim 24, wherein the stored instructions that, when executed, cause the co-processing unit to change the post-fault detection state information comprise stored instructions that, when executed, cause the co-processing unit to write at least a portion of the stored user context information to at least one memory location of the processing unit when one of the operation commands is issued requiring the use of the at least one memory location.

26. A computer-readable memory comprising stored instructions such that when executed cause a co-processing unit to:
store, during normal operation of the processing unit, user context information;
issue, during the normal operation of the processing unit, operation commands to the processing unit that request the processing unit to perform requested operations different from operations performed by the co-processing unit, wherein one or more of the operation commands includes at least a portion of the user context information; and
restore the processing unit, upon detection of a fault condition associated with a processing unit, using the stored user context information.

27. The memory of claim 26 wherein the stored instructions that, when executed, cause the co-processing unit to detect the fault condition comprise stored instructions that, when executed, cause the co-processing unit to detect that at least one of:
an input associated with the co-processing unit has received information identifying the fault condition; and
at least one memory location associated with the processing unit contains information indicating a fault condition.

28. The memory of claim 27 wherein the stored instructions that, when executed, cause the co-processing unit to detect that at least one memory location contains information indicating a fault condition comprises stored instructions that, when executed, cause the co-processing unit to least one of:
detect an initial fault condition based on monitoring at least another memory location associated with the processing unit in normal operation and verifying the initial fault condition as the fault condition based on determining that the at least one memory location associated with the processing unit contains information indicating the fault condition;
determine that at least one processing unit identification memory location associated with the processing unit contains incorrect processing unit identification information; and
determine that at least one pixel clock memory location associated with the processing unit contains incorrect pixel clock information.

29. The memory of claim 26, wherein the stored instructions that, when executed, cause the co-processing unit to restore the processing unit comprises stored instructions that, when executed, cause the co-processing unit to:
prevent at least one of the operation commands from being issued to the processing unit; and
reinitialize at least one memory location associated with the processing unit to a working state using an initialization routine.

30. The memory of claim 29, wherein the stored instructions that, when executed, cause the co-processing unit to reinitialize the at least one memory location associated with the processing unit to a working state using an initialization routine comprises stored instructions that, when executed, cause the co-processing unit to:
write default information to the at least one memory location associated with the processing unit; and
write initialization information to the at least one memory location associated with the processing unit.

31. The memory of claim 26, wherein the stored instructions that, when executed, cause the co-processing unit to restore the processing unit comprises stored instructions that, when executed, cause the co-processing unit to:
use the stored user context information to determine a pre-fault detection state information of at least one of the processing unit, one or more display devices associated with the processing unit, and one or more circuits associated with the processing unit; and
change post-fault detection state information of the at least one of the processing unit, the one or more display devices, and the one or more circuits to match a determined pre-fault detection power state based on the stored user context information.

32. The memory of claim 31, wherein the stored instructions that, when executed, change the post-fault detection state information comprise stored instructions that, when executed, cause the co-processing unit to write at least a portion of the stored user context information to at least one memory location associated with the processing unit when one of the operation commands is issued requiring the use of the at least one memory location.

33. The memory of claim 26 the memory further comprising stored instructions that, when executed, cause the co-processing unit to reinitialize a display via an initialization sequence upon detection of the fault condition.

* * * * *

UNITED STATES PATENT AND TRADEMARK OFFICE
CERTIFICATE OF CORRECTION

| | | |
|---|---|---|
| PATENT NO. | : 7,702,955 B2 | Page 1 of 1 |
| APPLICATION NO. | : 11/319926 | |
| DATED | : April 20, 2010 | |
| INVENTOR(S) | : de Almeida et al. | |

It is certified that error appears in the above-identified patent and that said Letters Patent is hereby corrected as shown below:

Column 13, line 46, claim 11: "a processing" to read as --the processing--

Column 15, line 14, claim 20: "the device" to read as --a device--

Signed and Sealed this
Twelfth Day of July, 2011

David J. Kappos
*Director of the United States Patent and Trademark Office*